United States Patent [19]
Belser

[11] Patent Number: 5,327,408
[45] Date of Patent: Jul. 5, 1994

[54] OPTICAL DISK WITH SECTOR SERVO PATTERNS COMPENSATING FOR VARIATIONS IN PATTERN SIZE AND/OR RADIAL VELOCITY

[75] Inventor: Karl A. Belser, Los Gatos, Calif.

[73] Assignee: International Business Machines Corporation, Armonk, N.Y.

[21] Appl. No.: 579,434

[22] Filed: Sep. 7, 1990

[51] Int. Cl.$^5$ .............................................. G11B 7/00
[52] U.S. Cl. ................................. 369/44.26; 369/275.3
[58] Field of Search ............ 369/44.26, 44.41, 44.34, 369/59, 275.3, 124, 275.1, 275.4; 360/77.05, 77.08, 77.06, 77.07, 114

[56] References Cited

U.S. PATENT DOCUMENTS

| | | | |
|---|---|---|---|
| 4,608,618 | 8/1986 | Sturtevant-Stuart | 360/77.07 |
| 4,669,004 | 5/1987 | Moon et al. | 369/48 |
| 4,785,442 | 11/1988 | Ohtake et al. | 369/44.32 |
| 4,910,617 | 3/1990 | Brunnett et al. | 360/77.05 |
| 4,924,060 | 5/1990 | Tung | 360/77.06 |
| 5,038,339 | 8/1991 | Pasman et al. | 369/275.3 |
| 5,050,144 | 9/1991 | Henderson et al. | 360/114 |
| 5,063,546 | 11/1991 | Ito et al. | 369/32 |
| 5,065,382 | 11/1991 | Seko et al. | 369/44.26 |
| 5,070,421 | 12/1991 | Sumiya et al. | 360/77.07 |
| 5,073,833 | 12/1991 | Best et al. | 360/77.01 |
| 5,134,601 | 7/1992 | Greenwell et al. | 369/44.26 |

Primary Examiner—Aristotelis Psitos
Assistant Examiner—Thang V. Tran
Attorney, Agent, or Firm—Henry E. Otto, Jr.

[57] ABSTRACT

An optical disk has groups of features (such as depressed areas) arranged in a preselected position sensing servo pattern, and a flat, non-grooved surface between a plurality of circumferentially spaced sectors. A single photodetector senses the change in amplitude of reflected light as a spot from a laser passes over one of the features and generates position sensing signals corresponding to the pattern. At least three phases of the position sensing signal are generated for each sector. Each phase is determined by edges on the disk offset circumferentially with respect to each other and separated radially from each other by a preselected critical distance that is independent of the pitch of the recording tracks on the disk to provide a track error signal that is substantially linear within a desired range to either side of a zero-crossing point.

Each even sector includes a plurality of features formed in an arrangement which is the complement and/or reversal in order circumferentially of their arrangement in the intervening odd sectors to cancel simultaneously, by averaging the position sensing signals from adjacent sectors, errors caused by variations in pattern size and/or radial velocity of an optical head as it moves generally radially of the disk.

19 Claims, 10 Drawing Sheets

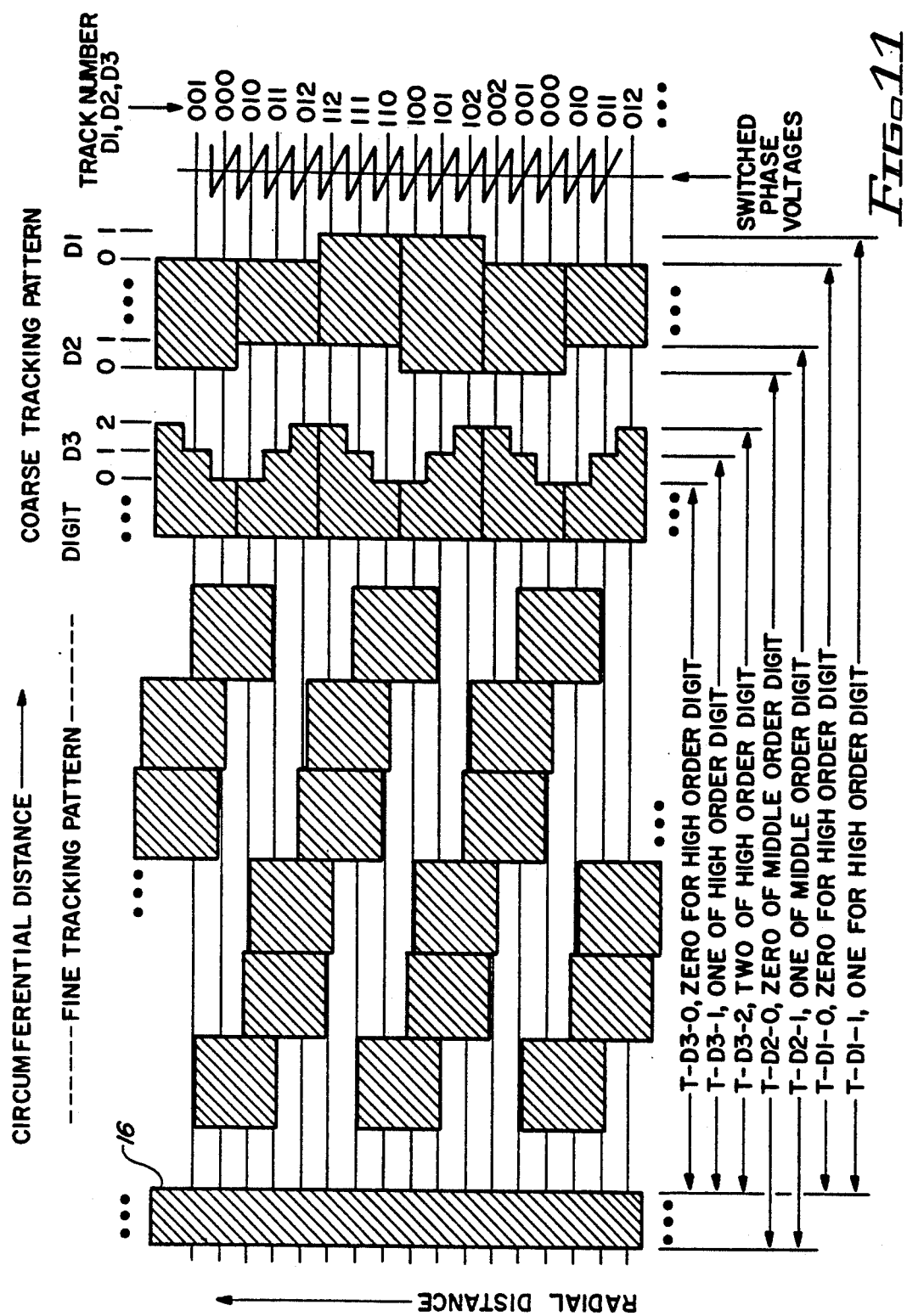

OPTICAL DISK WITH SECTOR SERVO PATTERNS COMPENSATING FOR VARIATIONS IN PATTERN SIZE AND/OR RADIAL VELOCITY

This invention relates to sector servo systems for optical disks and, more particularly, to such systems wherein the servo patterns provide automatic compensation for variations in pattern size that may occur during fabrication of the optical disk and/or for variations in radial velocity of an optical head as it moves generally radially of the disk.

BACKGROUND OF THE INVENTION

Optical disk drives in current use employ grooved disks and split photodetectors to provide position sensing information. The grooves introduce noise into the data channel, reducing data capacity. Due to thermal and other effects, the area of the spot imaged on the photodetector may not be equally split between the two detector halves. Also, grooved disks do not contain track-type information.

To overcome these and other problems, sector servo systems have been proposed with circumferentially spaced sector patterns comprising "features" (embossments or depressions) that extend radially from the inner to the outer diameter of the data band. The data recording surface of the data band is flat between the sector pattern so there is no signal degradation. The servo pattern edges (and hence diffraction orders) used for tracking error signals (TES) are separated in time, directed onto a single (rather than split) photodetector, and used to calculate the TES. Offsets due to tilt, objective lens translation, and thermal shift are eliminated because there is no split detector. Finally, there is no coupling between the tracking features and focus error signal (FES) because the laser beam can be focused on the flat data recording area and turned off when over the sector area containing position information.

A consortium of Japanese manufacturers is proposing for low end optical drives a sector servo system in which the position of "di-bits" is varied to encode track type information. It uses di-bits in the form of dots, thereby providing a track error signal of very limited linearity. Also, it provides no means to compensate for radial velocity error. During radial seek operations, spots are sensed as being closer; as a result of this distortion of the velocity in relation to the change in radial distance, the radial distance is not accurately sensed. Finally, it provides no means to automatically compensate for variations in pattern size that may occur during fabrication of the disk.

In the commonly owned copending application, U.S. Ser. No. 07/392,035, filed Aug. 8, 1989, now U.S. Pat. No. 5,134,601, issued Jul. 28, 1992, a sector servo system is disclosed which employs a multi-phase servo pattern that provides both fine tracking and coarse seeking position information. The fine tracking pattern provides, for each phase, sets of uniformly spaced edges whose positions are fixed by the track pitch and cannot be varied. While this system works satisfactorily, the track error signal has limited linearity and, due to the nonvariable relationship of the edges, it is not possible to optimize the edge spacing to minimize sensitivity to tilt and to variations in spot size.

No prior art known to applicant provides a sector servo system having two interleaved sets of servo patterns, those of one set being a permutation (i.e., a reversal and/or the complement) of those of the other set, thereby to provide a tracking error signal which automatically compensates for variations in radial velocity of an optical head as it moves generally radially of the disk and/or cancels the effects of process variations during fabrication of the disk. Nor does any known prior art provide a sector servo pattern having for each phase two edges that are independently variable.

SUMMARY OF THE INVENTION

A sector servo system is provided for an optical disk that has groups of features (such as depressed areas) arranged in a preselected position sensing servo pattern. A single photodetector senses the change in amplitude of reflected light as a spot from a laser passes over one of the features and generates position sensing signals corresponding to the pattern. At least three phases of the position sensing signal are generated. Each phase is determined by at least one pair of edges offset circumferentially with respect to each other and separated radially from each other by a preselected distance that is independent of the pitch of the recording tracks on the disk so as to provide from the phases of the position sensing signal a track error signal that is substantially linear within a desired range to either side of a zero-crossing point. The critical distance does not change despite variations in servo pattern size during fabrication.

The disk has a flat, non-grooved surface between a plurality of circumferentially spaced sectors. Each even sector includes a plurality of features formed in an arrangement which is the complement and/or reversal in order circumferentially of their arrangement in the intervening odd sectors to cancel simultaneously, by averaging the position sensing signals from adjacent sectors, errors caused by variations in pattern size and/or radial velocity of an optical head as it moves generally radially of the disk.

BRIEF DESCRIPTION OF THE DRAWINGS

FIG. 11 is a diagram showing how the fine tracking and coarse seeking track and sector information is encoded.

DESCRIPTION OF PREFERRED EMBODIMENTS

Figure 1:
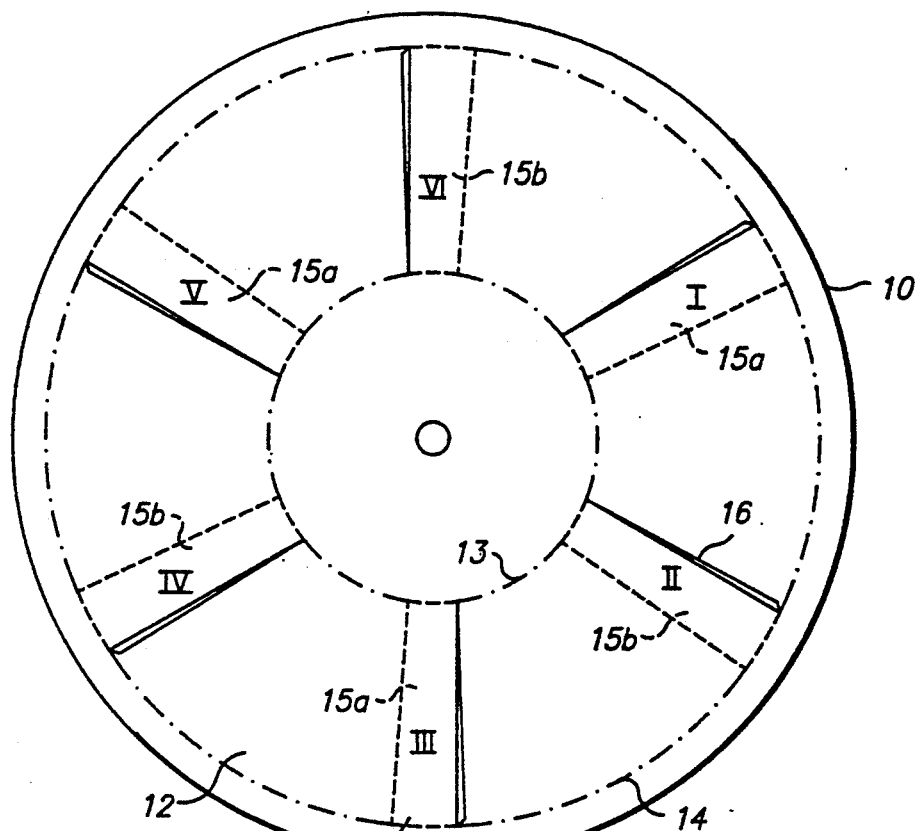
FIG. 1 is a plan view of an optical disk showing servo and data sectors.

As illustrated in FIG. 1, the optical disk 10 embodying the invention comprises a plurality of uniformly circumferentially spaced servo sectors 11 that are separated by flat, non-grooved data sectors 12. Sectors 11 and 12 extend from the inner diameter 13 to the outer diameter 14 of the data band. The disk has a plurality of concentric (or, if preferred, spiral) data recording tracks (not shown) between the inner and outer diameters 13,14.

Each servo sector 11 comprises a pattern 15 consisting of a plurality of "features" in the form of either depressed areas or raised areas in the otherwise flat surface of the disk. For purposes of this application, the features are assumed to be depressed areas. These depressed areas are deep enough (e.g., ¼ the wavelength of the laser beam) to cause the reflected light to change in amplitude as a laser spot passes over the depressed areas. The servo patterns, which provide three phases of a position sensing signal, are designed to give a linear fine tracking error signal to either side of the center of a track as a function of radial position.

According to a feature of the invention, and as will be described in greater detail presently, the sector servo pattern 15b in the even-numbered servo sectors II, IV, VI is a permutation of the sector servo pattern 15a in the odd-numbered sectors I, III, V, except that a wedge-shaped synchronization feature or bar 16 is always located at the leading edge of each sector. The expression "permutation of a sector servo pattern" as herein used, is intended generically to mean a preselected ordered rearrangement of the pattern, such as a reversal or the complement or both a reversal and the complement of the pattern.

These servo patterns 15a,b are designed to be as insensitive as possible to variations in laser spot size, radial velocity, pattern shape width and to media tilt. The patterns 15a,b also give coarse track-type information for the purposes of counting tracks when seeking and selecting the proper track center from a fine tracking signal.

Figure 2:
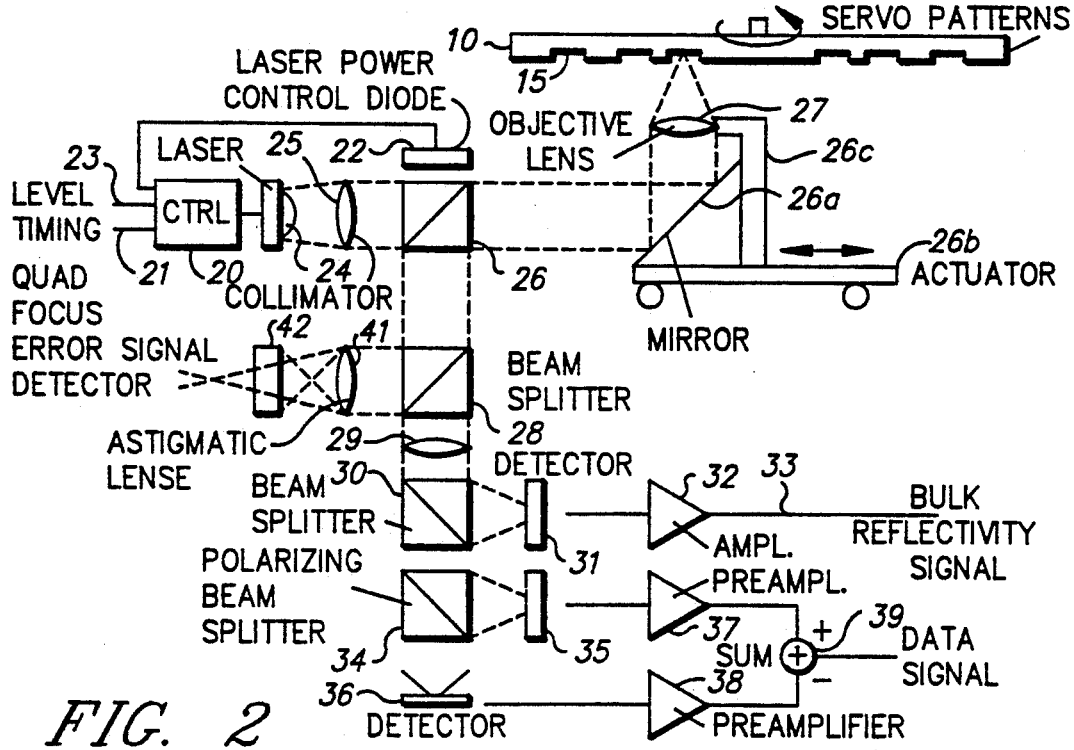
FIG. 2 is a schematic view of an optical system for use with an optical disk having a sector servo pattern.

In FIG. 2 is illustrated an optical system that may be used for sensing the servo pattern. A control circuit 20 responds to a timing signal in line 21 modulated by feedback from a laser power control diode 22 to control the voltage level applied via line 23 to control current to a laser 24. The beam of light from laser 24 is collimated at 25 and directed via a beamsplitter 26, a mirror 26a and objective lens 27 to focus a spot onto the sector servo pattern 15. From pattern 15 the focused light is reflected back through lens 27 and a mirror 26a to beamsplitter 26, which directs it via a beamsplitter 28, lens 29 and a beamsplitter 30 to a single photodetector 31. The signal from photodetector 31 is amplified by an amplifier 32 to provide a bulk reflectivity signal in line 33 that is used to decode information from the sector servo patterns 15a,b. Mirror 26a and objective lens 27 form part of an optical head that is movable by an actuator 26b in a generally radial direction relative to disk 10.

Some of the light passing through beamsplitter 30 is directed by a polarizing beamsplitter 34 onto a horizontal polarization detector 35 and onto a vertical polarization detector 36 for detecting magneto-optic data. Signals from detectors 35,36 are amplified at 37,38, respectively, and then subtracted at 39 to provide a data signal in line 40. The system also includes a conventional astigmatic lens 41 and quad focus error signal detector 42 that serve as the transducer for generating the focus error signal.

Figure 3:
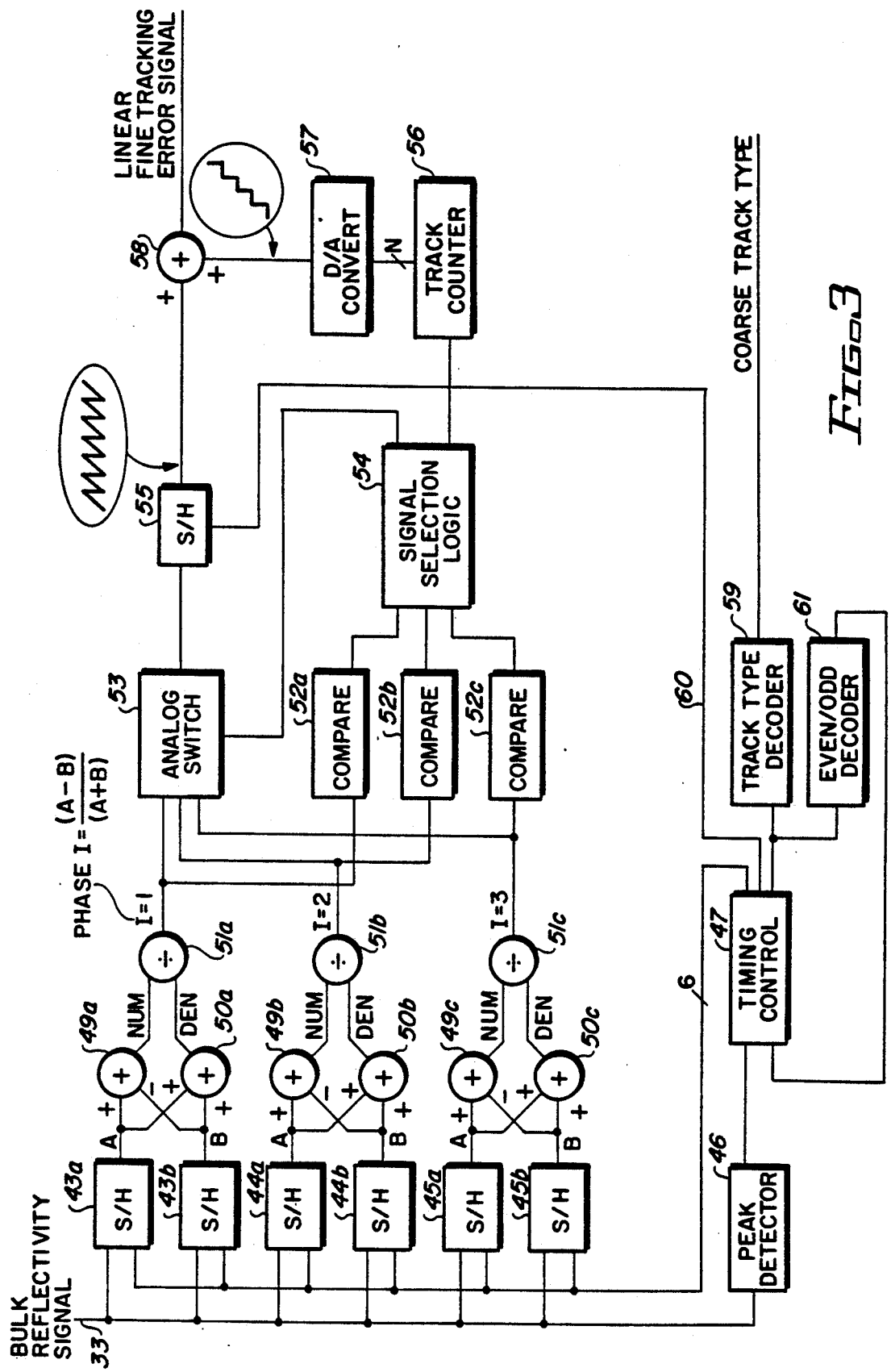
FIG. 3 is a schematic view of circuitry for detecting sector servo position information.
Figure 6:
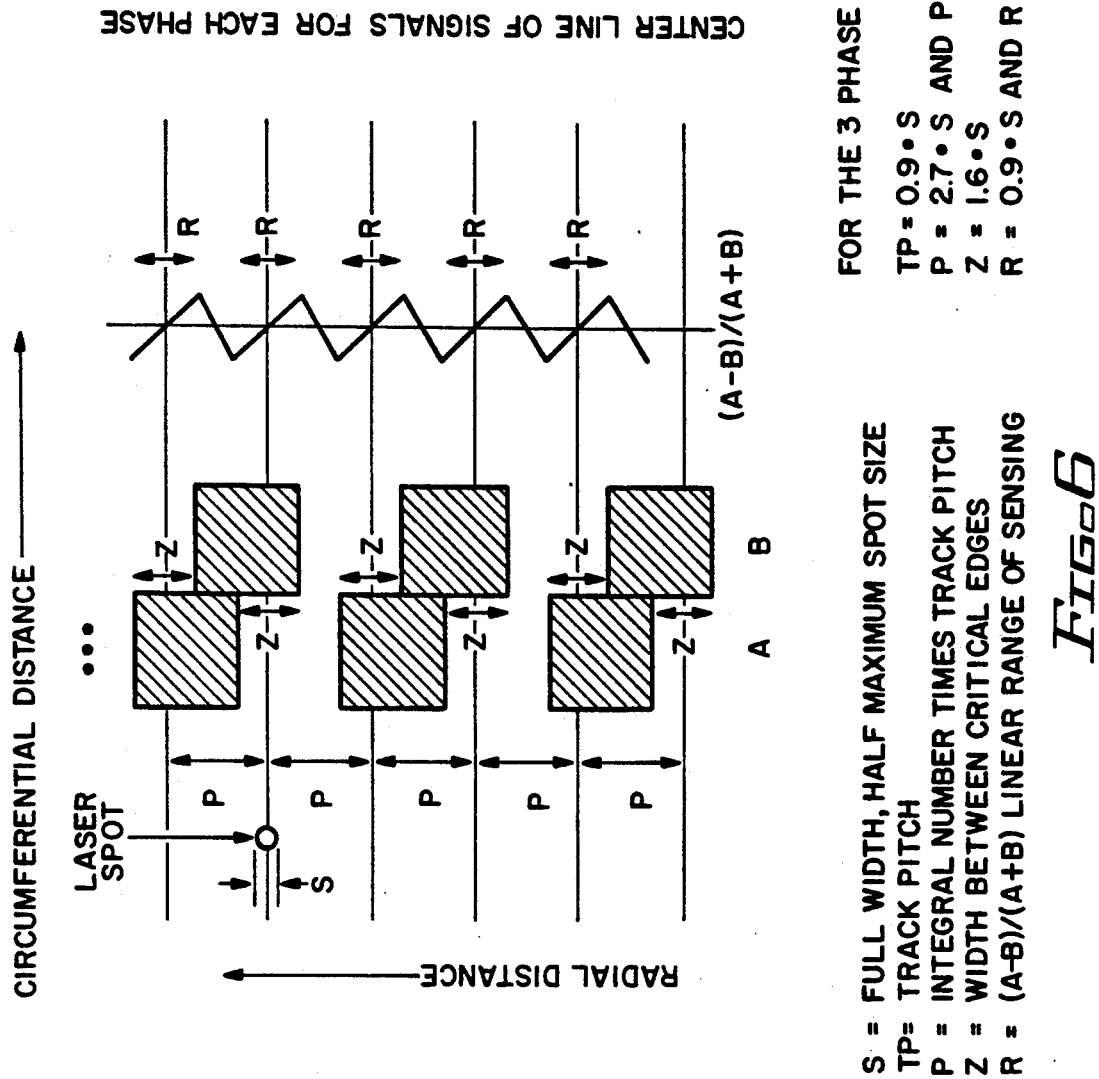
FIG. 6 is a diagram depicting the relationships between the various features of the sector servo pattern.

As illustrated in FIG. 3, the bulk reflectivity signal developed by the optical system of FIG. 2 is applied via branches of line 33 to three pairs 43,44,45 of sample and hold circuits and to a peak detector 46. When the laser spot hits the synchronization bar 16 of a pattern 15, detector 46 is triggered to provide an output to a timing control circuit 47. Circuit 47 provides in a six-channel bus 48 sample time pulses T-1A, T-1B, T-2A, T-2B, T-3A and T-3B that, as best shown in FIG. 6, are delayed equal increments of time from the instant the laser spot hits synchronization bar 16 for controlling the sample and hold circuits 43,44,45.

Assuming the same edge spacing is used as with grooved media, a sampled tracking error signal (TES) can be calculated as follows. The sample and hold circuits 43a,b respond to the sequential sample pulses T-A1 and T-B1, respectively, to provide time-spaced outputs A and B, respectively, to two summing circuits 49a,50a. Circuit 49a provides an output equal to (A−B); whereas circuit 50a provides an output equal to (A+B). A divider circuit 51a divides the (A−B) output of circuit 49a by the (A+B) output of circuit 50a to compute, for phase 1 of the three-phase fine tracking error signal, a value equal to (A−B)/(A+B).

Sample and hold circuits 44a,b output time-spaced signals A and B, respectively, to summing circuits 49b,50b for causing divider circuit 51b to compute for phase 2 of the three-phase track error signal a value equal to (A−B)/A+B.

Similarly, sample and hold circuits 45a,b and circuits 49c, 50c and 51c operate to compute the value for phase 3 of the track error signal.

The (A−B)/(A+B) outputs of each divider circuit 51a,b,c for the respective phases is connected to a respective comparator 52a,b,c and also in parallel to an analog switch 53. Each comparator 52a,b,c produces as an output a logic level "1" if the input level is positive and a logic level of "0" otherwise. The outputs of comparators 52a,b,c are each connected as inputs to signal selection logic circuitry 54 that produces outputs that control the analog switch 53. Switch 53 selects between the signals from divider circuits 51a,b,c according to the following selection algorithm:

|  | Outputs | | |
| --- | --- | --- | --- |
| Select | 51a | 51b | 51c |
| 51a |  | 0 | 1 |
| 51b | 1 |  | 0 |
| 51c | 0 | 1 |  |

The conditions where either (i) the outputs of 51a,b,c are all positive making all outputs of 52a,b,c "1", or (ii) the outputs of 51a,b,c are all negative making all outputs of 52a,b,c "0" are error conditions and do not occur in normal operation.

The timing control circuit 47 produces a signal 60 to control a sample and hold circuit 55 that samples the selected phase signal from switch 53 and holds it during the time between sectors.

Signal selection logic circuit 54 also produces incrementing and decrementing signals for a track counter 56, as shown in the following tabulation:

| Signal 60 | Selected Sector | Selected Previous Sector |
|---|---|---|
| Incrementing | 51a | 51c |
| Incrementing | 51b | 51a |
| Incrementing | 51c | 51b |
| Decrementing | 51a | 51b |
| Decrementing | 51b | 51c |
| Decrementing | 51c | 51a |

The N-line bus from track counter 56 controls a digital-to-analog converter (DAC) 57. The output of DAC 57 changes voltage in steps whose difference is equal to the peak to peak excursion range of the selected phase signals from the sample and hold circuit 55.

The sampled phase signal from circuit 55 and the output from DAC 57 are added together by an adder 58 to produce a linear fine tracking error signal over several adjacent tracks.

An even/odd sector decoder 61 controls the order of the timing pulses coming from the timing control circuit 47, such that order reversal of the sector pattern can be accounted for. The even/odd indication of the previous sector is used to control the order of the timing pulses that appear on bus 48. If previous sector type was encoded as an even sector, then the next sector to be decoded will be an odd sector. The sample and hold circuits in FIG. 3 are activated in the order 43a, 43b, 44a, 44b, 45a and 45b. If previous sector type was encoded as an odd sector, then the next sector to be decoded will be an even sector. The sample and hold circuits in FIG. 3 are activated in the order 45a, 45b, 44a, 44b, 43a and 43b.

Lastly, the track type decoder 59 measures the distance in time between the synchronization feature 16 and the features of pattern 15a or 15b that give coarse track type information.

Figure 4:
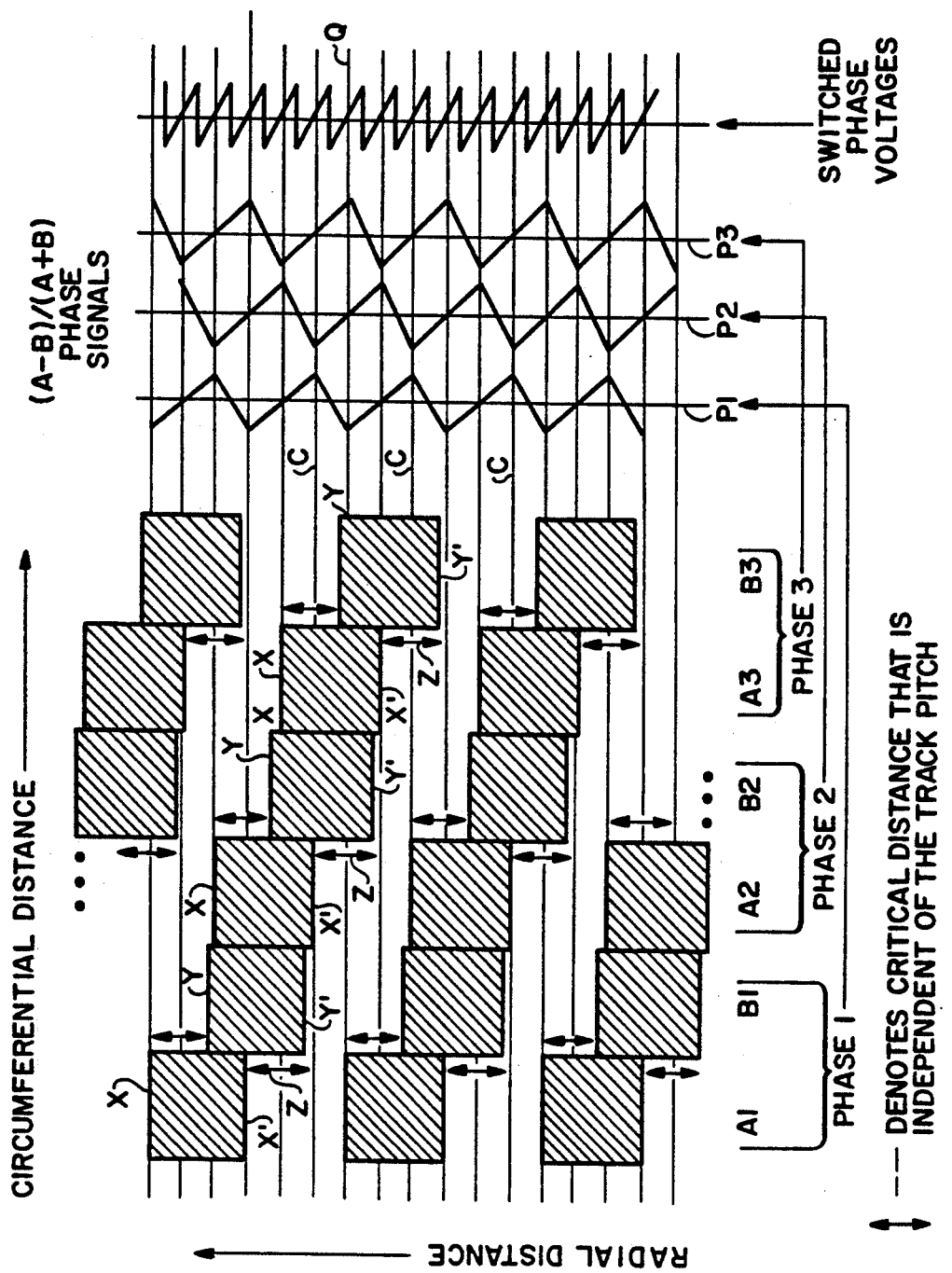
FIG. 4 depicts a three-phase servo pattern and the signals derived therefrom.

The sector servo pattern illustrated in FIG. 4 generates three phases of a fine tracking position sensing signal. As illustrated, the pattern comprises a series of depressed areas with pairs of parallel edges; however, in actuality, the areas have one pair of concentric edges with a fixed angular width circumferentially and equal radial lengths. But since the radius of curvature is so large in relation to the angular width of the edges, they may for all practical purposes be considered as parallel.

Figure 5:
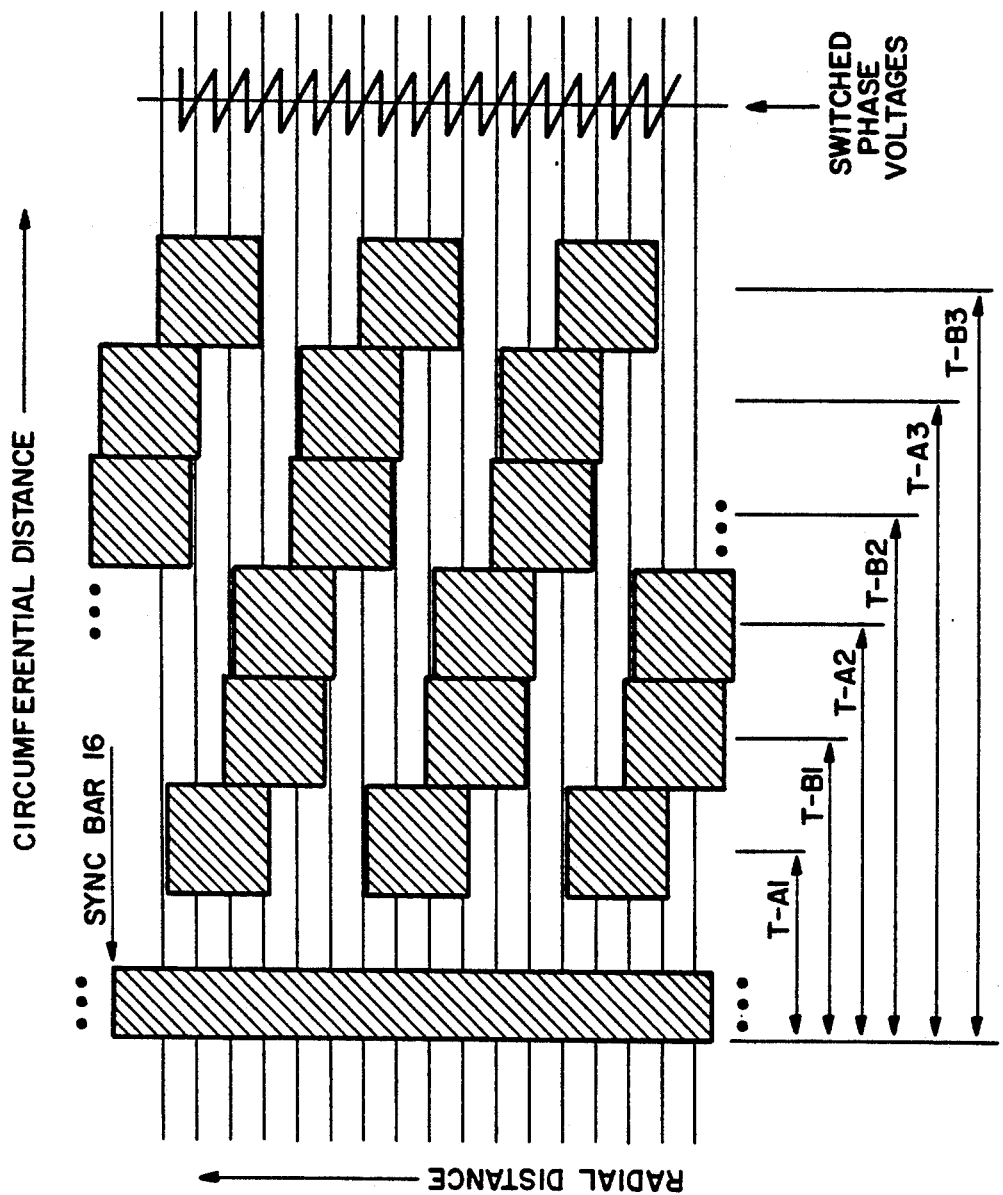
FIG. 5 is a diagram depicting how the sampling times for the three phases of the position sensing signal are determined.

Each phase is defined by two pairs X,X' and Y,Y' of concentric edges offset circumferentially with respect to each other but with corresponding edges X,Y and X',Y' being separated radially from each other by a preselected critical distance Z that, as hereinbelow noted, is chosen to optimize the linearity of the track error signal and is independent of the pitch of the recording tracks. The bulk reflectivity signals 33 at the center position of the edges are denoted as A1, B1, A2, B2, A3 and B3. These signals are sampled at the specified times T-A1, T-B1, T-A2, T-B2, T-A3 and T-B3 as shown in FIG. 5. The (A1−B1)/(A1+B1), (A2−B2)/(A2+B2) and (A3−B3)/(A3+B3) values for phases 1, 2 and 3, respectively, of the track error signals as a function of radial distance are shown as the signals labelled P1, P2 and P3. These signals will have a zero crossing (at which the tracking error signal changes polarity) defining a track center C at the location exactly half way between the X and Y or X' and Y' edges. The separation of edges Z can be specified to optimize the linearity of the tracking error signal phase to plus or minus one-half of the track pitch. The optimal separation will depend on the track pitch specified.

At the right of FIG. 4, switched phase voltages are depicted which denote the active phase of the tracking error signal. For example, line Q shows that maximum linearity is achieved during phase 2, during which the signal crosses the zero point along line P2.

FIG. 6 illustrates the basic pattern and gives as an example the dimensions of each radial feature with respect to the full width, half maximum laser spot sizes.

Figure 7:
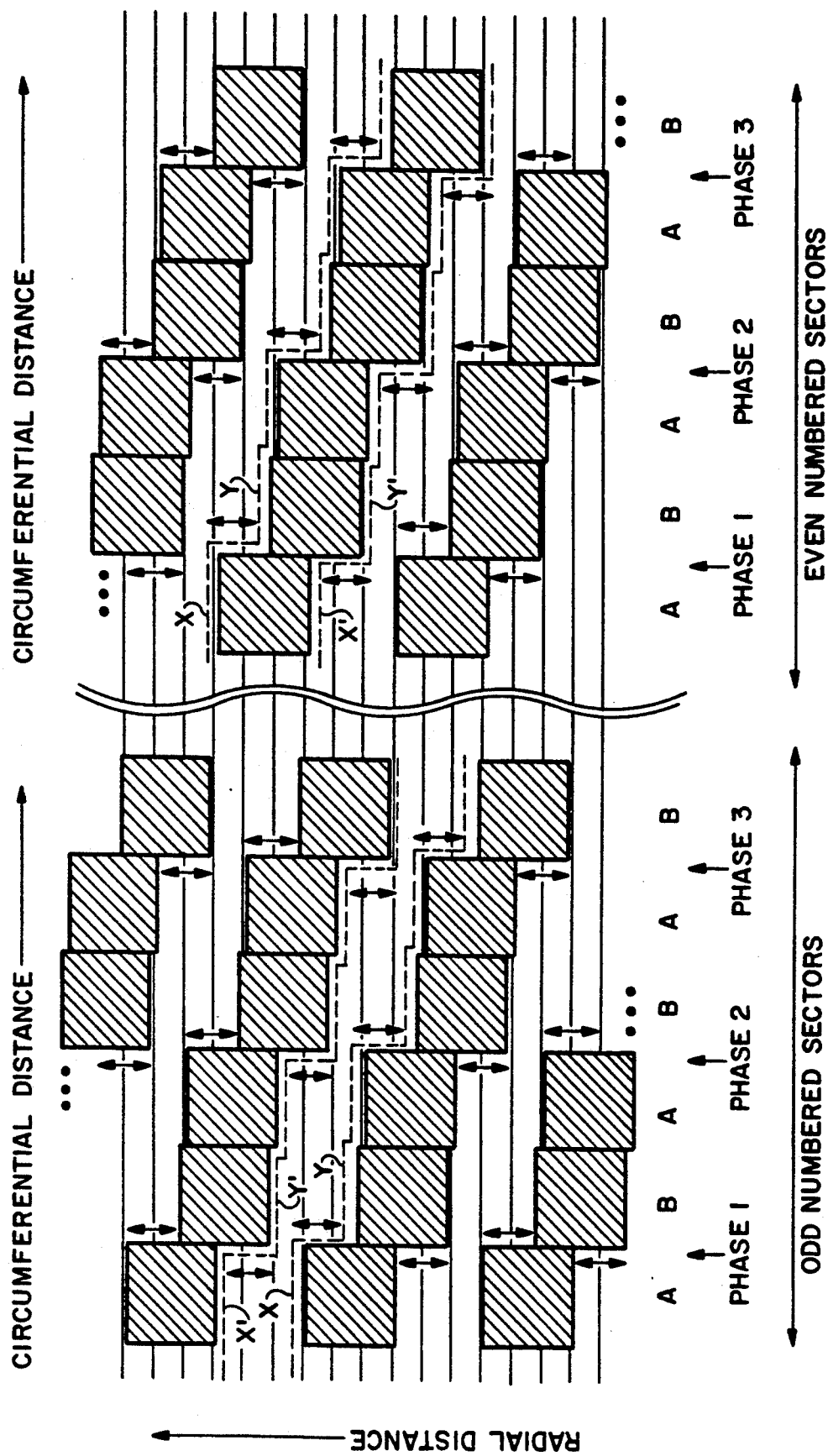
FIG. 7 depicts a three-phase servo pattern which according to the invention has pattern features in the even-numbered sectors which are the complement of those in the intervening odd-numbered sectors to compensate for errors due to pattern expansion during photolithic exposure while the disk is being fabricated.
Figure 8:
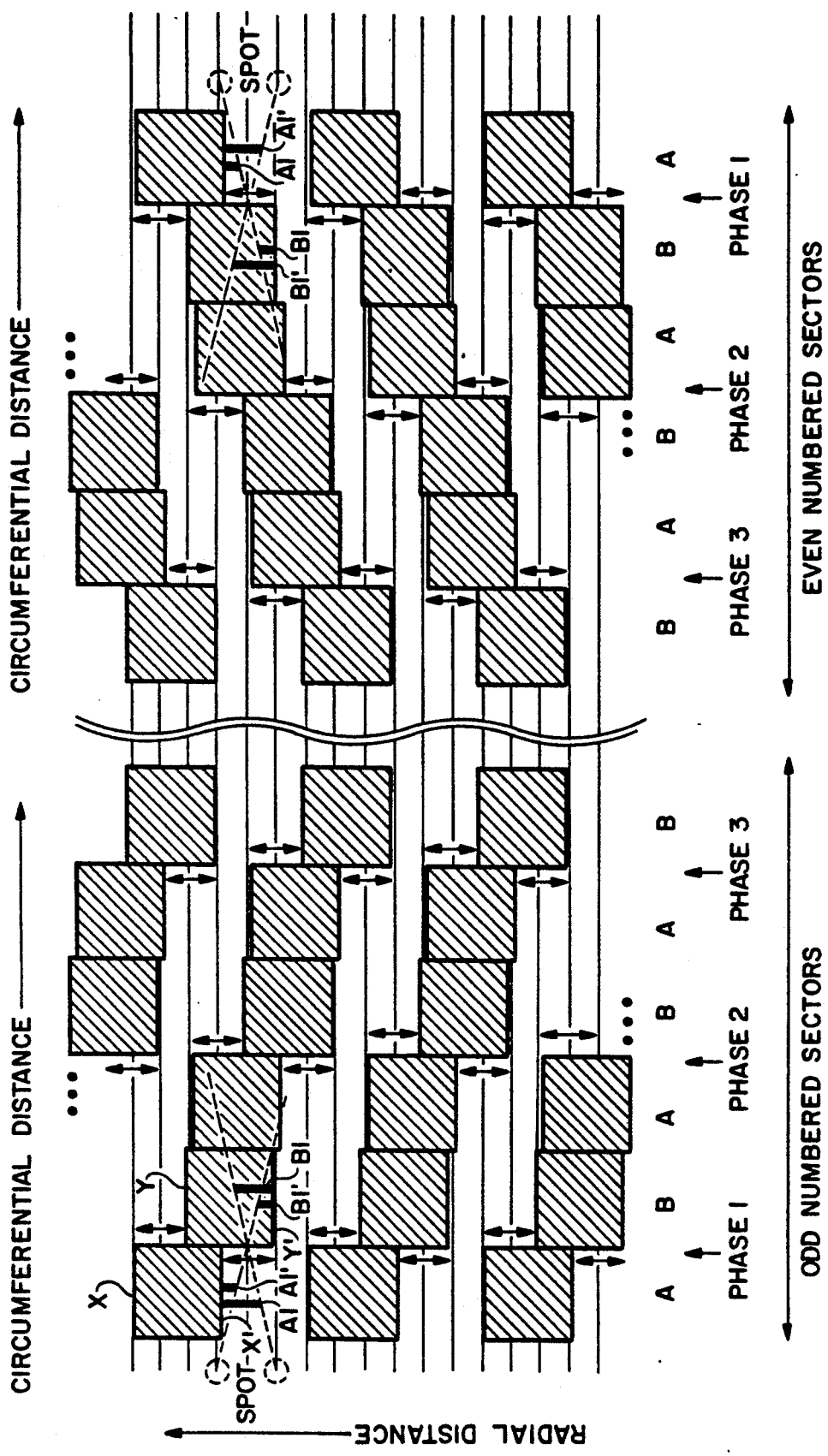
FIG. 8 depicts a three-phase servo pattern which according to the invention has pattern features in the even-numbered sectors which are reversed with respect to those of the intervening odd-numbered sectors to correct for errors due to variations in radial velocity of an optical head as it moves generally radially of the disk.
Figure 9:
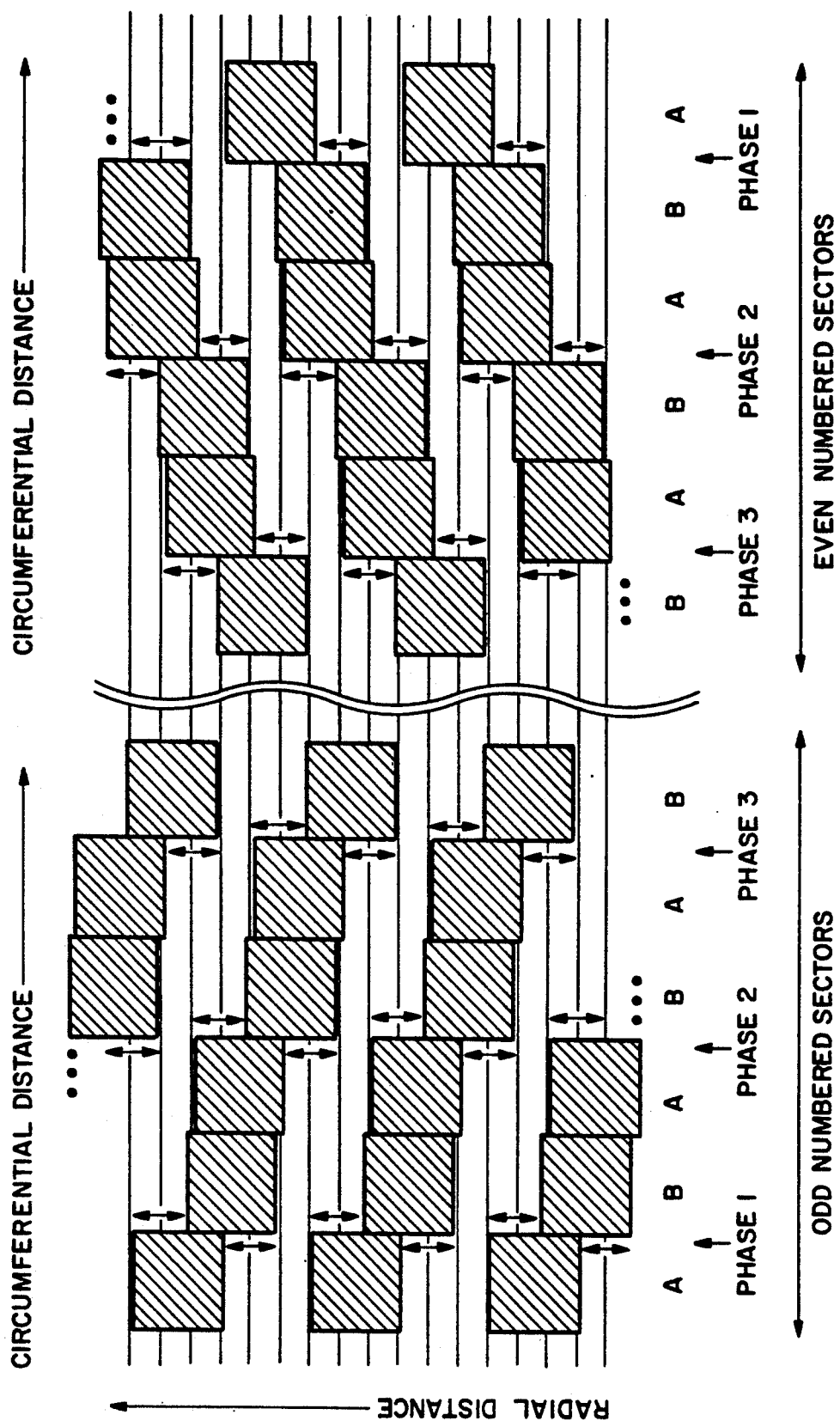
FIG. 9 depicts a three-phase servo pattern which according to the invention has pattern features in the even-numbered sectors which are both the complement of and reversed with respect to those in the intervening odd-numbered sectors to cancel errors due to both pattern size and radial velocity.

FIGS. 7, 8 and 9 show pattern variations between the odd-numbered sectors I, III and V and the even-numbered sectors II, IV and VI in FIG. 1. As will be explained more fully presently, FIG. 7 shows a pattern that compensates for variations in pattern size during media fabrication; FIG. 8 shows a pattern variation that compensates for variations in radial velocity; and FIG. 9 shows the patterns in FIGS. 7 and 8 combined into one pattern that compensates for variations in both pattern size and radial velocity.

FIG. 7 illustrates odd-numbered sectors on the left and even-numbered sectors on the right. The pattern on the right is the complement of the pattern on the left. Variations in pattern size occurring during media fabrication is illustrated by the dotted lines making the depressions wider than intended. Note that according to a feature of the invention, the critical distance Z is not changed by such expansion of the pattern shapes. However, the track centers corresponding to the features on the top edges X and Y of the pattern move up toward the outer diameter 14 as the pattern expands. Similarly, the track centers corresponding to the features on the bottom edges X' and Y' of the pattern move down toward the inner diameter 13 as the pattern expands. This effect repeats every three tracks in the original pattern shown in the left side of FIG. 7.

The apparent track center shiftings for the pattern on the right in FIG. 7 are exactly the opposite of those for the pattern on the left. The even and odd sectors are decoded alternately so that the offset errors are effectively averaged since the control system cannot respond to such rapid changes in the tracking error signal (TES) values. Hence, the pattern shown in FIG. 7 compensates for small variations in pattern size.

FIG. 8 illustrates odd-numbered sectors (e.g., I, III or V) on the left and even-numbered sectors (e.g., II, IV or VI) on the right. The pattern on the left is the mirror image of the pattern on the right such that the order of the features is exactly reversed. Variations in radial velocity of the laser spot as disk 10 turns is illustrated by a circular spot that moves from left to right across the pattern. Motion of the spot toward the outer diameter 14 is denoted by the dash line moving upward from left to right; whereas motion toward the inner diameter 13 is denoted by the dash line moving downward left to right. The slopes of these dashed lines showing the laser spot motion are highly exaggerated for purposes of illustrating the effect.

Thus, assuming the spot moves toward the outer diameter 14 in the left (odd sector) servo pattern, the center of the spot will appear to be at A1 and B1; i.e., farther from the edges X,X' and Y,Y', than if the spot remained at a constant radial location. This distortion causes the slope of the tracking error signal (TES) as a function of radial distance to be smaller than normal.

On the other hand, assuming the spot moves toward the inner diameter 13 in the left pattern, the spot will appear as at A1' and B1'; i.e., to be nearer to edges X,X' and Y,Y' than if the spot remained at a constant radial location.

This distortion causes the slope of the TES signal as a function of radial distance to be larger than normal. This slope is called the TES gain.

The apparent edge shiftings for the even sector pattern on the right are exactly the opposite to those for the pattern on the left. Motion of the spot toward the outer diameter 14 causes the edges to appear closer together, and motion toward inner diameter 13 causes the edges to appear father apart.

According to a feature of the invention, for small radial velocities, the changes in TES gain corresponding to these edge motions are equal and opposite between the left and right patterns. The even and odd sectors are decoded alternately so that the TES gain errors are effectively averaged because the control system cannot respond to such rapid changes in the TES values. Hence, the pattern shown in FIG. 8 compensates for small variations in radial velocity of an optical head (more specifically of lens 27, as illustrated) as it moves generally radially of the disk.

FIG. 9 depicts a servo pattern that combines the function of those of FIGS. 7 and 8. The pattern in the even-numbered sectors are both the complement and a reversal in sequence of the pattern in the odd-numbered sectors to thereby compensate for both variations in pattern size during fabrication and in radial velocity.

Figure 10:
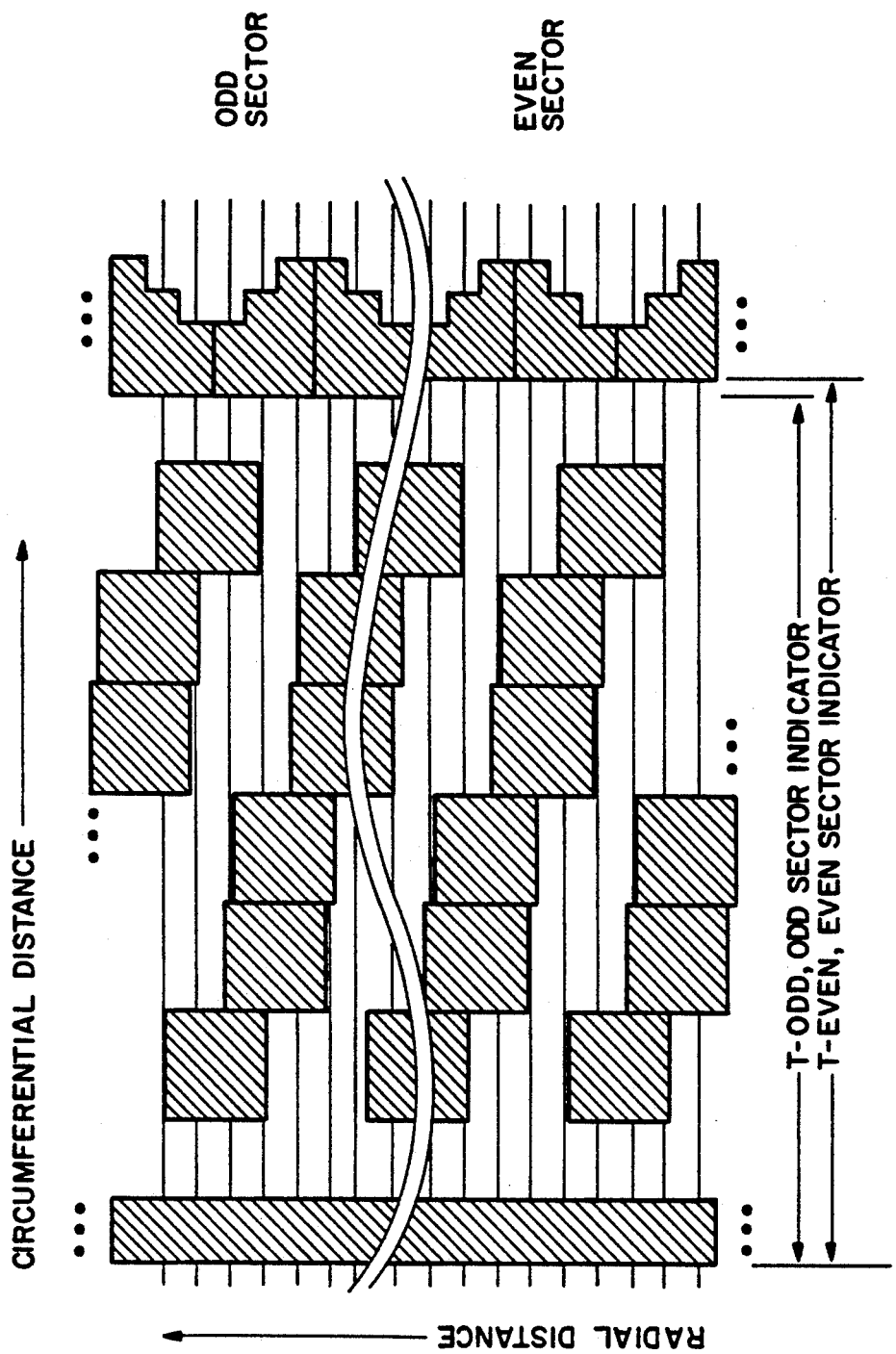
FIG. 10 is a diagram depicting how even and odd sectors are determined.

FIG. 10 illustrates the encoding of the odd and even sector information using times T-odd and T-even. Each time the laser spot, while focused on the pattern, crosses an edge, there is a pulse. These pulses are caused by the sharp decrease in the reflected beam due to interference cancellation of the signals from the flat surface and the surface of the feature. The times used to encode the information are those between these pulses. The times T-odd and T-even are measured from the leading edge of the synchronization bar 16 to the leading edge of the feature immediately following the fine tracking pattern.

Referring now to FIG. 3, the timing control circuit 47 quantizes the time following the synchronization bar 16 into discrete intervals, and the odd/even decoder 61 classifies the times at which the pulse corresponding to the even or odd edge occurs into an even or odd output, respectively. The even or odd output of decoder 61 is held in a latch (not shown) and used to control the sequence of timing for the sample and hold circuits 43, 44 and 45 over bus 48.

The synchronization bar 16 and the even/odd encoding radial edges may be located in a variety of positions relative to the fine tracking pattern. Therefore, it is important that the times be measured from leading edge to leading edge or alternately from trailing edge to trailing edge of bar 16 and of the edges to be decoded so that variations in pattern size during fabrication do not cause a change in the distance and hence time between the synchronization edge of bar 16 and the odd/even encoding feature.

FIG. 11 illustrates the encoding of a coarse track pattern into several digits that, when combined, represent coarse track type information over a range of many tracks. Each time that the laser spot, while focused on the pattern, crosses an edge, there is as earlier described a sharp decrease in the reflected beam due to interference cancellation of the signals from the flat surface and the surface of the feature. The times used to encode the information are those between these edge triggered pulses. The times T-D2-0 and T-D2-1 are measured from the leading edge of the synchronization feature 16 to the leading edge of the second feature following the fine tracking pattern. The times T-D3-0, T-D3-1 and T-D3-2 are measured from the trailing edge of synchronization feature 16 to the trailing edge of the first feature following the fine tracking pattern; whereas the times T-D1-0 and T-D1-1 are measured from the trailing edge of the synchronization feature to the trailing edge of the second feature following the fine tracking pattern. As explained in connection with FIG. 10, the timing control circuit 47 quantizes the time following the synchronization bar 16 into discrete intervals; however, the track type decoder 59 (FIG. 3) now classifies the times at which the pulse corresponding to the track type digit edge occurs into a track number.

Again, the synchronization bar 16 and the even/odd encoding radial edges may be located in a variety of positions relative to the fine tracking pattern. Therefore, it is important that the times be measured from leading edge to leading edge or alternately from trailing edge to trailing edge of bar 16 and of the edges to be decoded so that variations in pattern size during fabrication do not cause a change in the distance and hence time between the synchronization edge and the track type encoding features.

While the invention has been shown and described with respect to preferred embodiments thereof, it will be understood by those skilled in the art that changes in form and detail may be made in these embodiments without departing from the scope and teaching of the invention. Accordingly, the system and disk herein disclosed are to be considered merely as illustrative, and the invention is to be limited only as specified in the claims.

We claim:

1. In an optical storage system, the combination of:
an optical storage disk that has a plurality of recording tracks;
means including laser means for directing a spot of coherent light at selectable tracks on the disk during rotation of the disk;
said optical disk being divided into a plurality of circumferentially spaced sectors numbered in sequence, said sectors having imprinted servo patterns, each even-numbered sector comprising a plurality of features in the form of depressions or embossments constituting a permutation of the arrangement of such features in intervening odd-numbered sectors, said features being arranged in a preselected spot position sensing pattern defined in part by edges offset circumferentially with respect to each other and offset radially from each other by a preselected distance that is chosen to optimize linearity of a track error signal for a preselected size of said spot and is independent of the pitch of said tracks;
a single photodetector for sensing, during rotation of the disk, the change in amplitude of light reflected from the disk as the spot passes over one of the features for generating a position sensing signal corresponding to the pattern; and means for generating, from the light reflected, at least three phases of the position sensing signal, each of which phases is determined by said edges so as to cause the track error signal to be substantially linear within a desired range to either side of a point at which said track error signal changes polarity.

2. The system of claim 1, wherein said preselected distance does not change despite variations in servo pattern size during fabrication.

3. The system of claim 1, wherein each feature extends radially and circumferentially for distances that vary according to its radial location, as necessary to assure that times for traversing similar features are equal at all tracks of the disk when the disk is rotated at a constant angular velocity.

4. The system of claim 1, wherein each even-numbered sector includes features formed in one arrangement, and each intervening odd-numbered sector includes features formed in another arrangement which is the complement of said one arrangement.

5. The system of claim 4, wherein said arrangements compensate, by averaging the position sensing signals from adjacent sectors, for errors caused by variations in pattern size that occur during fabrication of the disk.

6. The system of claim 1, wherein each even-numbered sector includes a plurality of features formed in an arrangement which is the reversal in order circumferentially of their arrangement in intervening odd-numbered sectors.

7. The system of claim 6, wherein said means including laser means includes an objective lens for directing the coherent light, and said system comprises means for moving the lens generally radially of the disk, and wherein said arrangements in the even and odd-numbered sectors compensate, by averaging position sensing signals from adjacent sectors, for errors caused by variations in radial velocity of the lens as it moves generally radially of the disk.

8. The system of claim 1, wherein said means including laser means includes an objective lens for directing the coherent light, and said system comprises means for moving the lens generally radially of the disk, and wherein the disk is divided into a plurality of circumferentially spaced sectors, each even-numbered sector including a plurality of features formed in an arrangement which is both the complement and reversal in order circumferentially of their arrangement in intervening odd-numbered sectors numbered sequence, said arrangements compensating, by averaging the position sensing signals from adjacent sectors, for errors caused by variations in both pattern size and in radial velocity of the lens as it moves generally radially of the disk.

9. The system of claim 1, wherein said range extends from between about plus or minus one-half of the track pitch to provide minimal variation from a straight line.

10. The system of claim 1, wherein there are three phases, each side-by-side and each shifted radially by one-third of the pitch of the pattern with respect to an adjacent phase.

11. The system of claim 1, wherein the features have a depth of the order of about ¼ the wavelength of the beam that generates the laser spot.

12. The system of claim 1, wherein the pattern provides a linear track error signal to either side of the center of a selected one of the tracks as a function of radial position of said selected track.

13. The system of claim 1, wherein the pattern includes a synchronization feature which establishes times when information from successive circumferential portions of the pattern is to be sampled.

14. The system of claim 1, wherein the pattern provides coarse track-type information for counting the tracks during a seek operation to home in on a desired one of the tracks such that the time used to encode a track number is equal to the difference between either leading-to-leading or trailing-to-trailing edges of the position sensing signal, thereby to render said track number as encoded substantially insensitive to variations in pattern size that occur during fabrication of the disk.

15. The system of claim 12, wherein the track error signals are generated by the pattern in each phase, and the pattern provides information for determining the time order of decoding sequences for the track error signals of each phase in the even and odd-numbered sectors.

16. An optical data storage system comprising:
an optical storage disk divided into a plurality of circumferentially spaced sectors numbered in sequence, each even-numbered sector including a plurality of features, in the form of depressions or embossments, in a preselected ordered pattern which constitutes a permutation of their arrangement in each intervening odd-numbered sector;
laser means for directing a spot of coherent light at selectable tracks on the disk during rotation of the disk;
a single photodetector for sensing, during rotation of the disk, the change in amplitude of light reflected from the disk as the spot passes over one of the features for generating a position sensing signal corresponding to the pattern; and
means for generating for each sector, from the light reflected, at least three phases of the position sensing signal, each of which phases for a particular sector is determined by adjacent concentric edges on the disk offset circumferentially with respect to each other and separated radially from each other by a preselected distance that is chosen to optimize linearity of the position sensing signal for a preselected size of said spot and is independent of the pitch of said tracks so as to provide a track error signal that is substantially linear within a desired range to either side of a point at which the track error signal changes polarity.

17. An optical data storage system comprising:
an optical storage disk divided into a plurality of circumferentially spaced sectors numbered in sequence, each even-numbered sector including a plurality of features, in the form of depressions or embossments, in a preselected ordered pattern which constitutes a permutation of their arrangement in each intervening odd-numbered sector;
laser means for directing a spot of coherent light at selectable tracks on the disk during rotation of the disk;
a single photodetector for sensing, during rotation of the disk, the change in amplitude of light reflected from the disk as the spot passes over one of the features for generating a position sensing signal corresponding to the pattern; and
means for generating for each sector, from the light reflected, at least three phases of the position sensing signal, each of which phases for a particular sector is determined by said two pairs of equally radially spaced concentric edges on the disk, the concentric edges of each pair being offset circumferentially with respect to corresponding edges of the other pair, and the edges of each pair being separated radially from the edges of the other pair by a preselected distance that is chosen to optimize linearity of the position sensing signal for a preselected size of said spot and is independent of the pitch of said tracks so as to provide a track error signal that is substantially linear within a desired range to either side of a point at which the track error signal changes polarity.

18. In an optical storage system, the combination of:

an optical storage disk that has a plurality of recording tracks;

means including laser means for directing a spot of coherent light at selectable tracks on the disk during rotation of the disk;

said disk being divided into a plurality of circumferentially spaced sectors numbered in sequence, said sectors having imprinted servo patterns, each even-numbered sector comprising a plurality of features in the form of depressions or embossments constituting a permutation of the arrangement of such features in intervening odd-numbered sectors, said features being arranged in a preselected spot position sensing pattern defined in part by edges offset circumferentially with respect to each other and offset radially from each other by a preselected distance that is chosen to optimize linearity of a track error signal for a preselected size of said spot and is independent of the pitch of said tracks;

a single photodetector for sensing, during rotation of the disk, the change in amplitude of light reflected from the disk as the spot passes over one of the features for generating a position sensing signal corresponding to the pattern, said single photodetector providing, for each of at least three phases of the position sensing signal, two amplitude signals separated in time according to circumferential distance between two adjacent ones of said features, and including means for calculating a position sensing signal for each of said phases by computing the difference in said two amplitude signals divided by the sum of said two amplitude signals;

means including comparators for determining and selecting from said phases the one phase which is within its linear range;

a counter;

means for incrementing or decrementing the counter as the spot moves from said one phase to an adjacent phase during rotation of the disk;

means for converting the output of the counter to an amplitude signal which together with the position sensing signal for the selected phase provides the track error signal; and means for generating, from the light reflected, at least three phases of the position sensing signal, each of which phases is determined by said edges so as to cause the track error signal to be substantially linear within a desired range to either side of a point at which said track error signal changes polarity.

19. The system of claim 18, wherein the single photodetector provides two pulse signals separated in time according to circumferential distance between a synchronization feature and other features for encoding track numbers, and including means for decoding the time intervals between the leading edge of the synchronization feature and the leading edge of each said other feature defining the odd digits of a track number, or the trailing edge of the synchronization feature and the trailing edge of each said other feature defining the even digits of a track number in order to determine the track number.

* * * * *

UNITED STATES PATENT AND TRADEMARK OFFICE
CERTIFICATE OF CORRECTION

PATENT NO.    : 5,327,408
DATED         : July 5, 1994
INVENTOR(S)   : K. Belser et. al.

It is certified that error appears in the above-indentified patent and that said Letters Patent is hereby corrected as shown below:

Column 3, line 40, after "sector.", insert-- As shown in Fig. 1, the sectors are numbered in sequence from the bar 16 at the leading edge of sector I.--

Column 9, line 44, after"sectors,", insert-- numbered in sequence--

Signed and Sealed this

Thirteenth Day of December, 1994

Attest:

BRUCE LEHMAN

*Attesting Officer*    *Commissioner of Patents and Trademarks*